United States Patent
Bonnell

(10) Patent No.: US 6,641,029 B2
(45) Date of Patent: Nov. 4, 2003

(54) GUIDE ASSEMBLY FOR CUTTING TORCH

(76) Inventor: Donald G. Bonnell, 4649 W. Sierra, Glendale, AZ (US) 85304

( * ) Notice: Subject to any disclaimer, the term of this patent is extended or adjusted under 35 U.S.C. 154(b) by 0 days.

(21) Appl. No.: 10/113,748

(22) Filed: Apr. 1, 2002

(65) Prior Publication Data

US 2002/0144776 A1 Oct. 10, 2002

Related U.S. Application Data

(60) Provisional application No. 60/244,305, filed on Apr. 9, 2001.

(51) Int. Cl.[7] .................. B23K 37/04; B23K 31/02; B25B 11/00
(52) U.S. Cl. ................ 228/170; 228/44.5; 228/49.3; 228/174; 269/8
(58) Field of Search .................. 228/170, 174, 228/44.3, 44.5, 49.1, 49.3; 269/8

(56) References Cited

U.S. PATENT DOCUMENTS

| | | | | |
|---|---|---|---|---|
| 3,701,515 A | * | 10/1972 | Field et al. ............. | 266/70 |
| 3,747,911 A | * | 7/1973 | Skipper ................. | 266/70 |
| 3,785,631 A | * | 1/1974 | Prye .................... | 266/71 |
| 3,790,144 A | * | 2/1974 | Waldron ................ | 266/57 |
| 3,926,079 A | * | 12/1975 | Johnson et al. ......... | 82/159 |
| 3,941,358 A | * | 3/1976 | Darling ................. | 266/68 |
| 3,944,194 A | * | 3/1976 | Robinson ............... | 266/64 |
| 4,021,025 A | * | 5/1977 | Frame .................. | 266/58 |
| 4,030,710 A | * | 6/1977 | Turney ................. | 266/48 |
| 4,081,179 A | * | 3/1978 | Frame .................. | 266/70 |
| 4,087,670 A | * | 5/1978 | Miller ................. | 219/121.39 |
| 4,202,535 A | * | 5/1980 | Eriksson ............... | 266/56 |
| 4,256,288 A | * | 3/1981 | Rojas .................. | 266/70 |
| 4,283,043 A | * | 8/1981 | Kalian ................. | 266/66 |
| 4,330,110 A | * | 5/1982 | Creech ................. | 266/70 |
| 4,363,469 A | * | 12/1982 | Cruzan, II ............. | 266/77 |
| 4,383,870 A | * | 5/1983 | Creech ................. | 148/196 |
| 4,389,039 A | * | 6/1983 | Domres ................. | 266/77 |
| 4,391,433 A | * | 7/1983 | Doan ................... | 266/77 |
| 4,455,015 A | * | 6/1984 | Larikka ................ | 266/54 |
| 4,456,228 A | * | 6/1984 | Cable et al. .......... | 266/70 |
| 4,469,311 A | * | 9/1984 | Laing .................. | 266/67 |
| 4,593,887 A | * | 6/1986 | Peterson ............... | 266/48 |
| 4,743,149 A | * | 5/1988 | Geise .................. | 409/179 |
| 5,430,932 A | * | 7/1995 | MacLaggan et al. ...... | 29/798 |
| 5,443,199 A | * | 8/1995 | Krumszyn et al. ....... | 228/29 |
| 5,468,929 A | * | 11/1995 | Brolund et al. ........ | 219/121.56 |
| 5,575,971 A | * | 11/1996 | Bond ................... | 266/66 |
| 5,804,133 A | * | 9/1998 | Denton ................. | 266/66 |
| 5,853,655 A | * | 12/1998 | Baker .................. | 266/44 |
| 2002/0144776 A1 | * | 10/2002 | Bonnell | |

FOREIGN PATENT DOCUMENTS

DE  3308414 A1  *  9/1984
JP  357127576 A  *  8/1982

* cited by examiner

*Primary Examiner*—Tom Dunn
*Assistant Examiner*—Kiley Stoner
(74) *Attorney, Agent, or Firm*—Cahill, Von Hellens & Glazer P.L.C.

(57) ABSTRACT

A holder secured to the tip of a cutting torch supports a guide about which a hole is to be cut in a steel pipe or sheet. A fixture, magnetically attached to the pipe or sheet supports a magnetically retained fitting to be tack welded to the cut hole at the desired angular orientation relative to the pipe or sheet. After the fitting is tack welded, the fixture is removed and the weld is completed.

19 Claims, 2 Drawing Sheets

GUIDE ASSEMBLY FOR CUTTING TORCH

CROSS REFERENCE TO RELATED APPLICATIONS

The present application relates to subject matter disclosed in a provisional application entitled "Weld-O-Let Positioner", assigned Ser. No. 60/244,304 and assigned a filing date of Feb. 27, 2001 and describing an invention made by the present inventor. This application relates to subject matter described in and claims priority to a provisional application entitled "Straight Torch Hole Burning Adapter", assigned Ser. No. 60/244,305 and assigned a filing date of Apr. 9, 2001 and describing an invention made by the present inventor.

BACKGROUND OF THE INVENTION

1. Field of the Invention

The present invention relates to guides for cutting torches and, more particularly, to an assembly for cutting circular holes in steel pipes and plates and for positioning a mating fitting.

2. Description of Related Art

In the normal course of welding an assembly of pipes there exists a requirement to cut a round hole of a specific size and at a specific location in one of the pipes. Subsequently, a further pipe is mated with and welded to the cut hole. In some instances, a fitting, sold under the trademark "WELD-O-LET", is welded to the cut hole to provide threaded engagement for a threaded pipe to be attached to the fitting and associated pipe.

When the initial hole is cut freehand, circularity of the hole is often compromised but compensated for by the subsequent welding operation. When a WELD-O-LET fitting is to be attached, concentricity of the fitting with the hole is often compromised. Such lack of accuracy results in unnecessary flow restriction and pressure increase of the fluid flowing therethrough. This may result in a reduced flow rate or a requirement for a more powerful pump to cause fluid flow of an adequate volumetric rate.

SUMMARY OF THE INVENTION

An angularly offset pointer is positionally supported by a holder attached to the cylindrical portion of a conventional cutting torch tip. By angular rotational positioning of the pointer relative to its holder, the distance between the pointer and the cutting torch flame is set to define the radius of the hole to be cut. By placing the pointer in a dimple defining the center of the hole to be cut, the cutting torch is rotated about the pointer to accurately cut the hole to be formed in a steel pipe or sheet. A positioning fixture is magnetically attached to the pipe and magnetically supports a WELD-O-LET fitting at the cut hole to permit accurate tack welding of the WELD-O-LET fitting to the pipe. Thereafter, the positioning fixture is disengaged from the pipe and the WELD-O-LET fitting to permit final welding of the WELD-O-LET fitting to the pipe.

It is therefore a primary object of the present invention to provide an assembly for cutting a circular hole and for positioning a fitting to be attached thereto.

Another object of the present invention is to provide a guide for accurately cutting circular holes in a pipe or a sheet.

Yet another object of the present invention is to provide an adjustable guide for setting the radius of a circular cut to be made with a cutting torch.

Still another object of the present invention is to provide a hole cutting guide detachably attached to the tip of a cutting torch.

A further object of the present invention is to provide a magnetically attached fixture for magnetically positioning a fitting in concentricity with a cut hole.

A still further object of the present invention is to provide an assembly having a guide for accurately cutting a circular hole in a steel pipe or plate and a magnetically attached fixture for magnetically retaining a fitting to be welded in the cut hole.

A still further object of the present invention is to provide an inexpensive assembly for providing a guide to cut an accurate circular hole with a cutting torch and a fixture for accurately positioning a fitting concentric with the cut hole.

A still further object of the present invention is to provide a method for guiding the cutting of a hole in a steel pipe or plate and for magnetically attaching a fixture to locate a fitting in concentricity with the cut hole.

These and other objects of the present invention will become apparent to those skilled in the art as the description there proceeds.

BRIEF DESCRIPTION OF THE DRAWINGS

The present invention will be described with greater specificity and clarity with reference to the following drawings, in which.

DESCRIPTION OF THE PREFERRED EMBODIMENT

Figure 1:
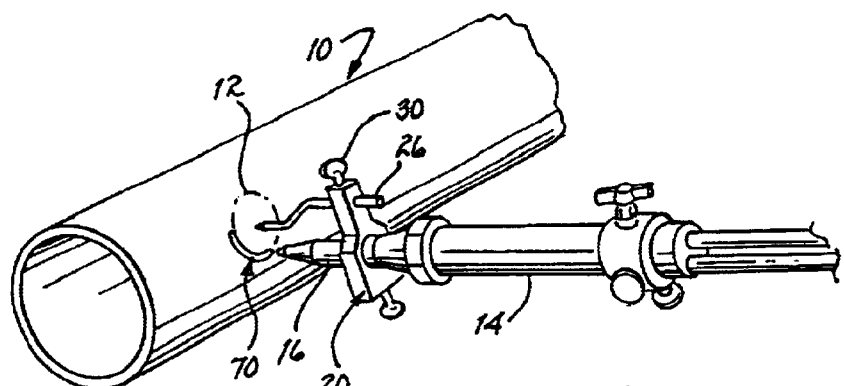
FIG. 1 illustrates a guide attached to a cutting torch accurately cutting a hole in a pipe.
Figure 2:
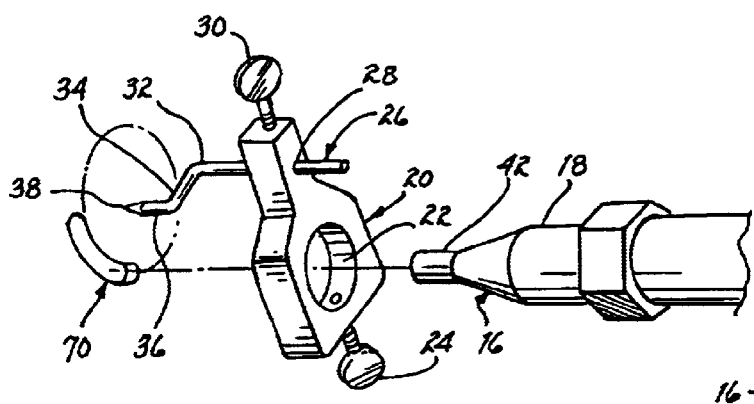
FIG. 2 illustrates the attachment of the guide to the cutting torch tip.
Figure 3:
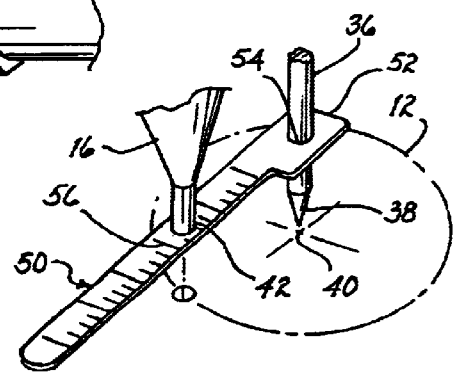
FIG. 3 illustrates a measuring device for use with the guide.

Referring to FIG. 1, there is representatively illustrated a steel pipe 10 in which a hole 12 is to be cut by a conventional cutting torch 14. The cutting torch includes a conventional tip 16 from which lighted gases are emitted in a narrow stream to heat and cut the pipe to form hole 12. Tip 16 includes a cylindrical shank 18 (see FIG. 2) at the base. As shown in FIGS. 1 and 2, a holder 20 includes a cylindrical passageway 22 for receiving and encircling shank 18. A set screw 24 is used to lockingly engage the holder with the shank. A guide 26 extends through a further passageway 28 formed in holder 20. It may be retainingly positioned relative to the holder by a set screw 30. The guide includes a body 32 for penetrable engagement with passageway 28. An offset section 34 extends from the body at an angle, such as 90 degrees as illustrated, and supports a pointed section 36 having a sharp point 38.

Referring jointly to FIGS. 1, 2, 3, and 4, the setting and operation of guide 26 will be described in further detail. Center 40 of hole 12 is determined and a conventional punch is placed at such location and struck by a hammer or the like to form a dimple in pipe 10. Point 38 of guide 26 is placed in the dimple at center 40 and set screw 30 is loosened to permit rotation of the guide within passageway 28 until the distance between terminal end 42 of the cutting torch is at a distance from point 38 that corresponds with the radius of hole 12 to be formed. To help set the distance between point 38 and terminal end 42, a scale 50 may be employed. The scale includes a base 52 having a hole 54 formed therein for snugly receiving pointed section 36. The scale includes delineations or markings 56 formed thereon corresponding with the distance measured from the center of hole 54, and therefore corresponding with point 38.

In operation, guide 26 is rotated within passageway 28 until terminal end 42 is located at a delineation 56 corresponding with the radius of hole 12 to be cut. After the guide is set by tightening set screw 30, scale 50 is removed from pointed section 36.

Figure 4:
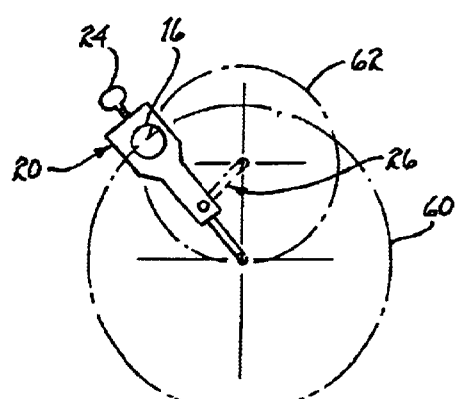
FIG. 4 illustrates different positions of the guide to vary the radius of the circular hole to be cut.

As particularly noted in FIG. 4, rotation of guide 26 relative to holder 20 will correspond with different sized circles 60,62 as a function of the rotational position of the guide relative to the holder. After guide 26 has been set in holder 20 to define a radius relative to cutting torch 16 corresponding with hole 12 to be cut, cutting torch 14 is lighted and sharp point 38 is placed in the dimple corresponding with center 40 of the hole. Thereafter, the cutting torch is rotated about the longitudinal axis of pointed section 36 and a circular cut 70 (see FIGS. 1 and 2) will be formed to create hole 12.

Figure 5:
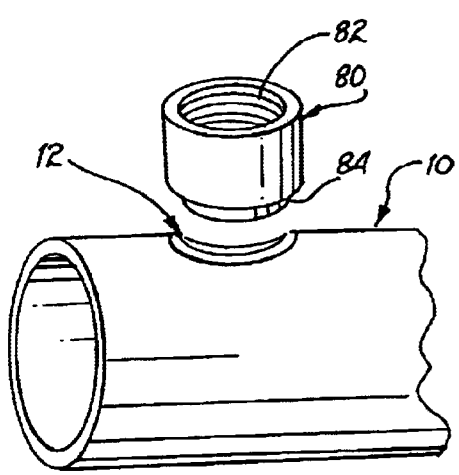
FIG. 5 illustrates a threaded fitting to be welded to a cut hole.

Referring to FIG. 5, there is shown a pipe 10 having a hole 12 formed therein by the apparatus and methodology described above. A fitting 80, known in the trade as a WELD-O-LET fitting, is available in many different sizes to correspond with each of various standard sized threaded pipes. The purpose of fitting 80 is that of permitting threaded engagement of one pipe with another. Accordingly, fitting 80 includes a plurality of threads 82. As a variation, fitting 80 may be devoid of threads and in such event, it is sometimes sold under the trademark "SOCK-O-LET". In the following discussion the fitting will be treated as of either type. It is further to be understood that fitting 80 may be of any other type used in the trade to perform the function of attaching an element to a pipe. The fitting also includes a circular beveled section 84 for mating with a correspondingly sized hole 12. This beveled section is curvilinear and generally commensurate with the three-dimensional curvature of hole 12 formed by the cutting torch. Generally, it is intended that fitting 80 be concentric with hole 12 and welded thereto to form a mechanical junction that is also sealed against leakage.

Since the angle of the pipe to be attached to fitting 80 and relative to pipe 10 is often critical, the position of the fitting relative to pipe 10 has to be precisely set prior to welding. To manually set and maintain fitting 80 at the appropriate orientation during at least an initial tack weld is difficult and requires a great deal of experience and expertise.

Figure 6:
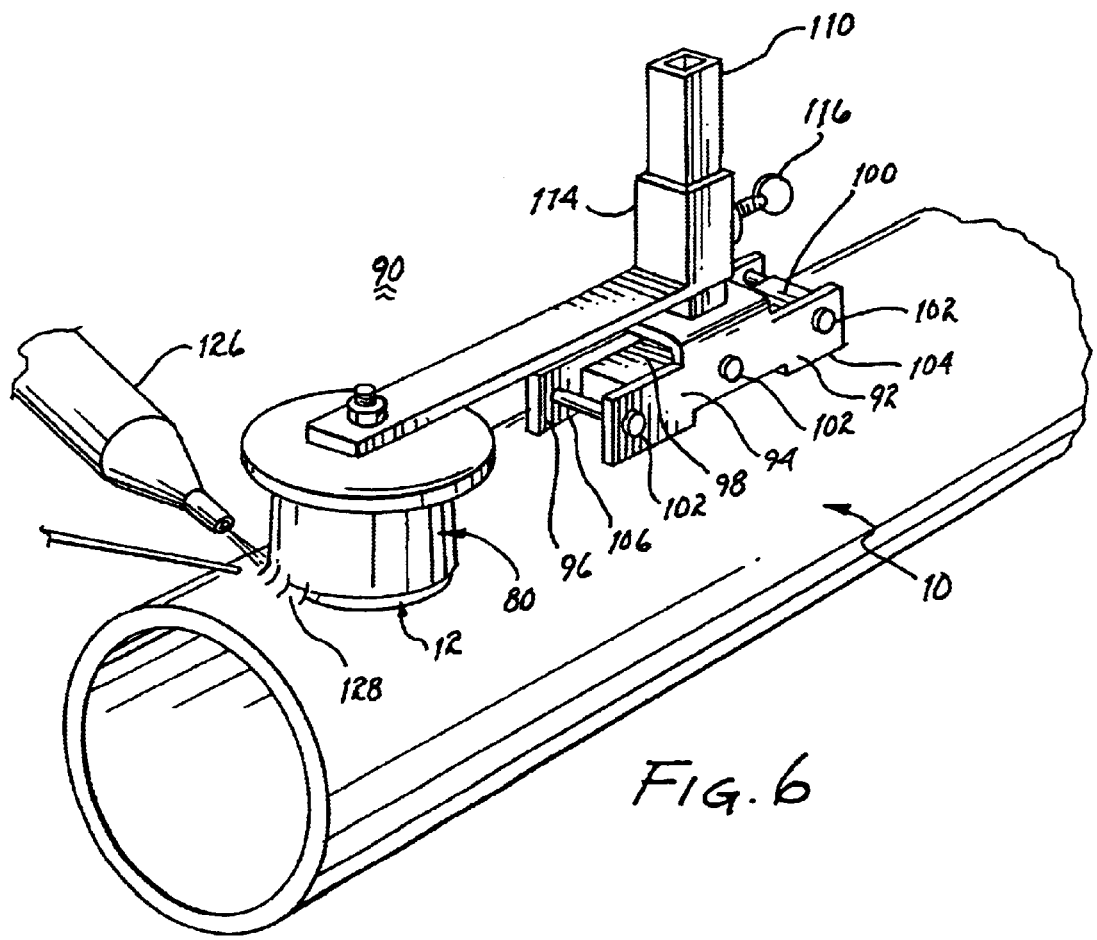
FIG. 6 illustrates a fixture for magnetically retaining in place the fitting to be welded to a pipe.
Figure 7:
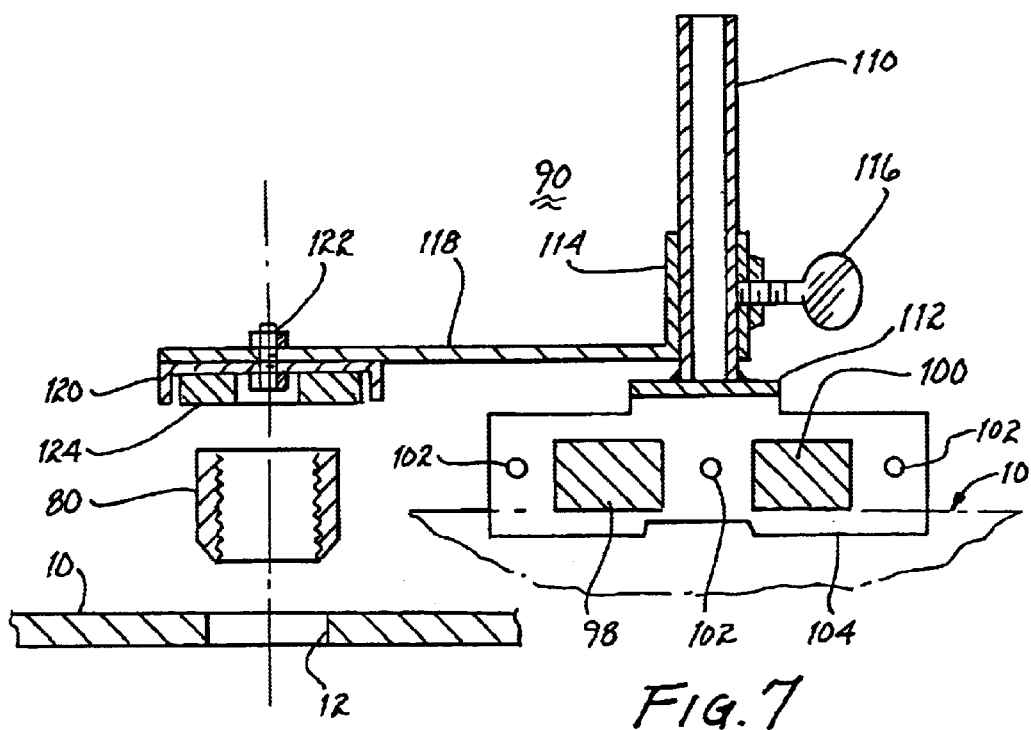
FIG. 7 illustrates a cross-sectional view of the fitting supporting fixture.

Referring jointly to FIGS. 6 and 7, there is illustrated a fixture 90 for setting fitting 80 in place prior to forming an initial tack weld. The fixture includes an element 92 U-shaped in cross-section and having a pair of sides 94,96. Element 92 supports one or more magnets, of which a pair of magnets 98,100 are shown. Rivets 102 stabilize sides 94,96 with respect to one another and retain magnets 98,100 therebetween by compressing the sides toward one another. As particularly shown in FIG. 7, magnets 98,100 are positioned above bottom edges 104,106 of sides 94,96, respectively, to permit the edges to bear against pipe 10 and retain the magnets in close proximity to the pipe.

A post 110 extends upwardly from cross-member 112 interconnecting sides 94,96. A slider 114 is in slidable engagement with post 110 and may be set with respect to the post by thumb screw 116. An arm 118 extends laterally from slider 114. The extremity of the arm supports a shallow tray 120, which tray is secured to the arm by a nut and bolt combination 122. An annular magnet 124 is secured within tray 120 by an adhesive or the like.

In operation, fitting 80 is brought into engagement with magnet 124 and is magnetically retained thereby. Fixture 90 is placed on pipe 10, as illustrated, to position fitting 80 in concentric relationship with cut hole 12. The vertical positioning of fitting 80 relative to pipe 10 is adjusted by moving slider 114 up or down along post 110. When fitting 80 is properly positioned in engagement with hole 12, thumb screw 116 is tightened. As illustrated in FIG. 6, a torch 126 is used to form a tack weld 128 to secure fitting 80 to pipe 10. Thereafter, fixture 90 is pulled off pipe 10 and fitting 80 and set aside. The weld to secure fitting 80 to pipe 10 then may be completed.

By inspection, it becomes apparent that fixture 90 is readily mountable, even in the most awkward positions in a work environment to retain fitting 80 in place. Moreover, mounting is simple as the retaining forces provided by magnets 98,100 permit easy positioning of the fixture without further locking or attachment devices. Similarly, manipulation of the fixture to properly position fitting 80, even at difficult to reach locations, is provided by magnets 98,100 exerting magnetic attraction forces.

As will be evident from the drawings, guide 26 and fixture 90 can be easily fabricated from materials available in any welding shop. Accordingly, both the guide and fitting are relatively inexpensive. The required magnets are readily commercially available at a modest cost.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention.

I claim:

1. An assembly for cutting a hole in a steel pipe or sheet with a cutting torch having a tip and for positioning a fitting at the hole for welding thereto, said assembly comprising in combination:

a) a holder adapted for attachment to the tip of the cutting torch;

b) a guide supported by said holder for setting the radius of the hole to be cut; and c) a fixture adapted to be magnetically attached to the pipe or sheet, said fixture being adapted to magnetically support the fitting to be welded to the hole proximate the hole.

2. An assembly as set forth in claim 1 wherein said guide includes an offset pointed section adapted for engagement with a dimple formed at the center of the hole to be cut.

3. An assembly as set forth in claim 2 wherein said guide is rotatable and lockable with respect to said holder to vary the distance between the tip of the cutting torch and the dimple and permit setting the radius of the hole to be cut.

4. An assembly as set forth in claim 1 wherein said fixture includes an arm adapted to support a magnet for magnetically retaining the fitting.

5. An assembly as set forth in claim 4 including a post and a slider translatable along said post for supporting said arm.

6. An assembly as set forth in claim 5 including lock means for lockingly positioning said slider along said post.

7. An assembly as set forth in claim 1 wherein said fixture includes a pair of opposed sides for supporting at least one magnet therebetween.

8. An assembly as set forth in claim 7 including a cross member interconnecting said pair of sides and an arm supported by said cross member and adapted to support the fitting.

9. An assembly as set forth in claim 1 wherein said guide includes an offset pointed section for engagement with a dimple formed at the center of the hole to be cut.

10. An assembly as set forth in claim 9 wherein said guide is rotatable and lockable with respect to said holder to vary the distance between the tip of the cutting torch and the dimple and permit setting the radius of the hole to be cut.

11. A method for forming a round hole in a steel pipe or sheet with a cutting torch and attaching a fitting thereto, said method comprising the steps of:
   a) attaching a guide to the cutting torch and setting the guide from the tip of the cutting torch a distance commensurate with the radius of the hole to be cut;
   b) rotating the cutting torch about the guide to cut the hole;
   c) magnetically locating a fixture on the pipe or sheet, which fixture includes an arm for magnetically supporting a fitting to be welded to the hole;
   d) positioning the arm and/or fixture to locate the fitting concentric with the hole; and
   e) tack welding the fitting to the hole.

12. The method as set forth in claim 11 including the step of adjusting the height of the arm along a post of the fixture.

13. The method as set forth in claim 11 including the step of removing the fixture on completion of the tack welding step.

14. A fixture for magnetically positioning a fitting to be welded to a hole cut in a steel pipe or sheet, said fixture comprising in combination:
   a) a pair of opposed sides for supporting at least one magnet for magnetically attaching said fixture to the pipe or sheet;
   b) a cross member adapted to engage said pair of sides;
   c) a post extending from said cross member;
   d) an arm supported by said post;
   e) a further magnet secured to said arm for magnetically retaining the fitting adjacent the hole prior to and during tack welding of the fitting to the hole.

15. A fixture as set forth in claim 14 including a slider adapted to slide along said post, and a lock for locking said slider along said post, said slider being adapted to support said arm.

16. A fixture as set forth in claim 15 wherein said lock comprises a set screw.

17. A fixture as set forth in claim 14 including a tray secured to said arm for supporting said further magnet.

18. A fixture as set forth in claim 17 wherein said further magnet is an annular magnet.

19. A fixture as set forth in claim 14 wherein said at least one magnet comprises a pair of magnets.

\* \* \* \* \*